(12) United States Patent
Fislage et al.

(10) Patent No.: US 10,114,989 B2
(45) Date of Patent: Oct. 30, 2018

(54) RFID READING APPARATUS AND METHOD FOR BIN OCCUPANCY RECOGNITION IN A SHELF

(71) Applicant: SICK AG, Waldkirch (DE)

(72) Inventors: Michael Fislage, Waldkirch (DE); Alexander Guenther, Waldkirch (DE)

(73) Assignee: SICK AG, Waldkirch (DE)

(*) Notice: Subject to any disclaimer, the term of this patent is extended or adjusted under 35 U.S.C. 154(b) by 0 days.

(21) Appl. No.: 15/651,421

(22) Filed: Jul. 17, 2017

(65) Prior Publication Data

US 2018/0018483 A1 Jan. 18, 2018

(30) Foreign Application Priority Data

Jul. 18, 2016 (DE) .................. 10 2016 113 205

(51) Int. Cl.
*G06Q 90/00* (2006.01)
*G06K 7/10* (2006.01)

(52) U.S. Cl.
CPC ..... *G06K 7/10316* (2013.01); *G06K 7/10009* (2013.01); *G06K 7/10128* (2013.01); *G06K 7/10356* (2013.01); *G06K 7/10366* (2013.01)

(58) Field of Classification Search
CPC ................. G06Q 10/087; G06Q 10/08; G06K 2017/0045
USPC ............................... 235/383, 385; 340/572.1
See application file for complete search history.

(56) References Cited

U.S. PATENT DOCUMENTS

2007/0215700 A1* 9/2007 Reznik ............... G06Q 10/08
235/385

FOREIGN PATENT DOCUMENTS

| DE | 101 28 177 A1 | 12/2002 |
| DE | 10 2013 222 263 A1 | 4/2015 |
| EP | 2 903 086 A1 | 8/2015 |

OTHER PUBLICATIONS

Office Action dated Apr. 24, 2017 issued in corresponding German Application No. 102016113205.5.

* cited by examiner

*Primary Examiner* — Jamara Franklin
(74) *Attorney, Agent, or Firm* — Nath, Goldberg & Meyer; Jerald L. Meyer

(57) ABSTRACT

An RFID reading apparatus (18) for bin occupancy recognition in a shelf (10) is provided having at least one antenna (16), an RF transceiver (20) connected to the antenna (16), a control and evaluation unit (22) that is configured to communicate with an RFID transponder (24) by means of RFID signals via the RF transceiver (20) and the antenna (16), and having at least one additional sensor (24) for detecting objects at or in the shelf (10). In this respect, the control and evaluation unit (22) is configured to recognize and locally associate changes of the bin occupancy from a combination of information of the antenna (16) and information of the additional sensor (24).

14 Claims, 3 Drawing Sheets

RFID READING APPARATUS AND METHOD FOR BIN OCCUPANCY RECOGNITION IN A SHELF

Figure 1:
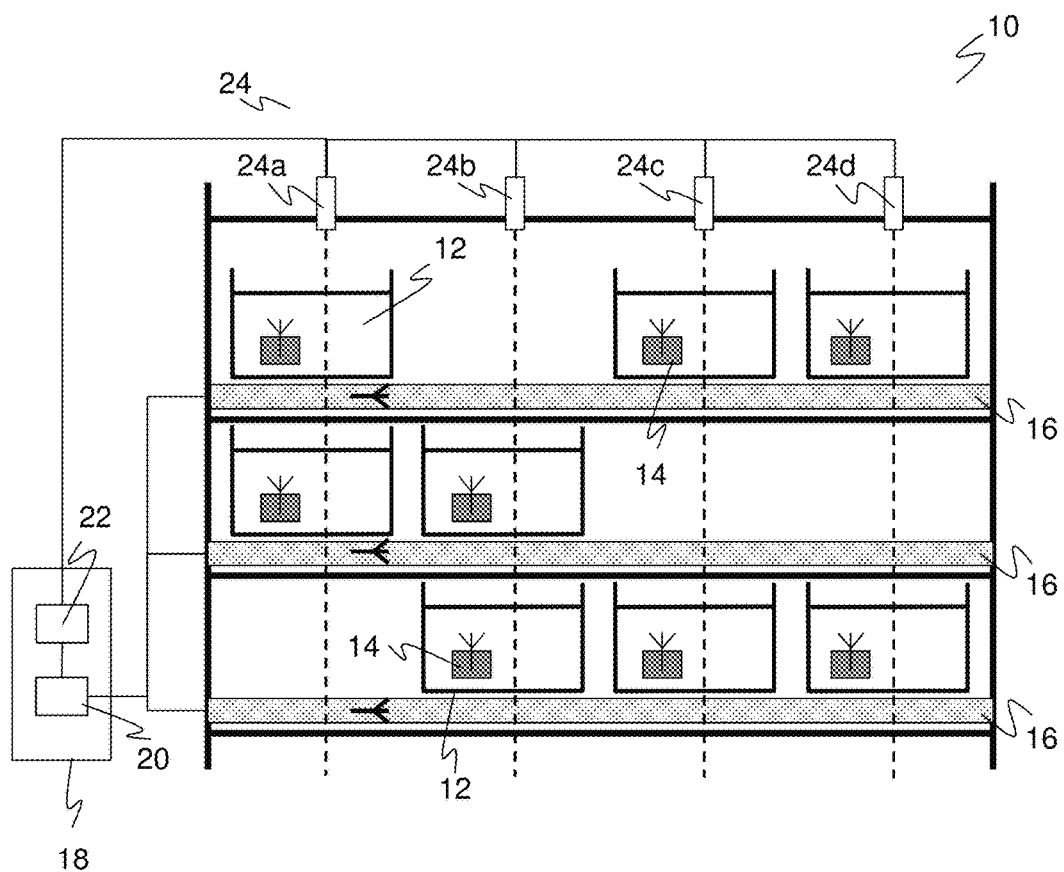

The invention relates to an RFID reading apparatus for bin occupancy recognition in a shelf having at least one antenna, an RF transceiver connected to the antenna, a control and evaluation unit that is configured to communicate with an RFID transponder by means of RFID signals via the RF transceiver and the antenna, and having at least one additional sensor for detecting objects at or in the shelf. The invention further relates to a method of bin occupancy recognition in a shelf, in which communication takes place with RFID transponders in the shelf by means of RFID signals via an antenna, wherein objects at or in the shelf are detected using an additional sensor.

RFID reading system serve for an automatic identification of objects. For this purpose, RFID transponders fastened to the objects are read and information is optionally written back into the transponder. The detected information is used to detect the location, the target or other properties of the objects and thereby to control the storage and the flow of goods and products. There are different types of RFID transponders that differ, for example, in the frequencies used or as to whether they work actively with their own energy supply or passively with the transmission energy of the reading system. One example is the established ultrahigh frequency standard (UHF) ISO 18000-6 for passive transponders that are read in accordance with the backscatter procedure.

The objects provided with transponders are above all frequently stacked in an ordered manner during storage and are arranged in a plurality of levels or rows. The typical example for this a shelf with bins or container rows. In this case, the RFID reading system should satisfy the demand of detecting the respective current shelf occupancy, that is which bins are occupied, or whether a container is located at a specific shelf position and what the respective bin or container instantaneously contains. The information of the transponders can also be kept consistent on a refilling or removal of objects by writing back to the transponder. Transponders can in this respect be located both at the respective bins or containers and at the individual objects stored therein.

One application for the automatic detection of the shelf occupancy is production process control where the warehousing can be substantially reduced by knowledge of the local stocks and of the instantaneous requirement of starting materials and intermediate products measured on the removal (Kanban principle). Containers in a Kanban shelf should, for example, be recognized at the rear shelf side during loading and at the front shelf side during removal. For this purpose, RFID transponders have to be read over the total shelf width, and indeed also with differently wide boxes or bin widths. Small spacings between bins and metal designs of the shelves or containers are a further characteristic.

RFID systems used for shelf occupancy recognition in the prior art use a plurality of reading apparatus in a lateral installation with recessed antennas per shelf level, container row or even container. The predefined lateral antenna position requires a lateral arrangement of the transponders. In addition, high integration costs arise for the effort for the installation of the antennas and above all their cabling. This effort is not only incurred once, but again on maintenance of or changes to the shelf, for example on the use of different containers. In is additionally difficult or even impossible to localize containers exactly and thus to associate them with shelf bins.

EP 2 903 086 A1 discloses an RFID reading apparatus for shelf occupancy recognition. In this respect, a plurality of antenna circuit boards are inserted into an elongated hollow section. The technical effort is comparatively high in this process since a tunable antenna is present at practically every reading point. A very small installation and maintenance effort is thus admittedly achieved, but with high manufacturing costs for a large number of individual antennas. It is also proposed in this respect to attach additional light barriers to recognize whether a container is located at a respective position. Such a localization completely by an additional sensor system is admittedly conceivable, but requires high-cost solutions such as numerous light barriers to actually distinguish every position in the shelf. An alternative approach is to use the antenna itself as a sensor for presence recognition. However, high-cost segmentable antennas are required for this purpose with narrowly limited reading fields together with a complex intelligent evaluation.

It is therefore the object of the invention to improve bin occupancy recognition using an RFID reading apparatus.

This object is satisfied by an RFID reading apparatus and by a method for bin occupancy recognition in a shelf in accordance with the respective independent claim. The RFID reading apparatus is able to communicate with RFID transponders via RFID signals. An additional sensor for the detection of objects is additionally provided for attachment to the shelf or in its environment. The invention now starts from the basic idea of recognizing and localizing changes of the bin occupancy by a combination of information of the antenna and of the additional sensor. It is thus recognized whether and where goods or containers are present in the shelf or whether they are moved, placed in or removed. The information of the antenna can be very simple, for instance only which antenna communicates with a transponder, and is as a rule independent of the specific exchange of RFID information. The information of the antenna only has to enable a localization in part since it is supplemented by the information of the additional sensor that can in another respect comprise a plurality of individual sensors. In the second step, an association of the data read from an RFID transponder with a shelf position is then conceivable in which a change of the bin occupancy has been recognized.

The invention has the advantage that an automatic identification and association of an object such as a product or a container with a shelf bin is made possible by a combination of the antenna and the additional sensor. The antenna is anyway present to read RFID information. It also participates in the localization due to a dual function. Neither the antenna nor its evaluation has to be complex in this respect because only a contribution is expected and not a complete localization. This applies accordingly to the additional sensor that can likewise remain very simple and inexpensive. A high spatial resolution is nevertheless achieved. The RFID reading apparatus in accordance with the invention has small space requirements in front of the shelf, can be scaled to variable container sizes and shelf sizes and also provides a modular concept for non-standardized shelf systems. It can in this respect be set up and integrated inexpensively and can also be retrofitted in existing shelf systems.

The additional sensor is preferably an optoelectronic sensor. The detection principle is completely independent of RFID frequencies so that mutual interference is precluded. In addition, there is a plurality of numerous usable optoelectronic sensors that can be simple individual sensors such as light barriers, but also more complex area scanners such as laser scanners.

The antenna is preferably arranged in parallel with the shelf elements or is used as a shelf element. Depending on the embodiment, the antenna itself is part of the shelf, serves for its stabilization or is at least installed in the shelf such that, unlike a conventional cabling, it does not interfere with any procedures. The antenna can be installed in a horizontal or perpendicular orientation to detect correspondingly mutually arranged shelf sections or containers in a targeted manner.

The antenna is preferably an antenna elongated over the shelf width or shelf height, for example a rod antenna. The antenna can also be assembled from a plurality of antennas connected in series. A relatively simple antenna concept with field radiation over the total length of the antenna is sufficient. Localization is achieved with the aid of the additional sensor.

The RFID reading apparatus preferably has a respective antenna at each shelf level, with the antennas respectively having antenna lobes only upwardly or only downwardly. The antenna therefore has a directional characteristic in which radiation only takes place in a direction perpendicular to the longitudinal extent (high front-to-back ratio). This can also be achieved by a metal screen in the non-desired direction. If the range of the antenna is now correspondingly restricted, one antenna is selectively responsible for one shelf plane.

Alternatively, the RFID reading apparatus has a respective antenna at every second shelf level, with the antennas each having antenna lobes upwardly and downwardly. It therefore has symmetrical antenna lobes or a small front-to-back ratio. A directional characteristic that restricts unnecessary radiation to the front and to the back is nevertheless useful. Such antennas are each responsible for two shelf levels, with it also being conceivable to nevertheless attach them in every shelf level and to evaluate the redundant additional information in a suitable manner.

The antenna and the additional sensor are preferably configured and arranged such that the information of the antenna enables a local association with a shelf level and the information of the additional sensor enables a local association within the shelf level. It is sufficient to recognize as the information for the determination of the shelf level which antenna can read an RFID transponder or, also without an RFID reading process, the antenna at which a change takes place, for example by a metal container and a corresponding detuning. The additional sensor then only has to deliver the local information within the shelf plane. If the shelf has vertical separation elements, a complementary vertical antenna arrangement with horizontally detecting additional sensors is also conceivable. However, the idea is of the case of a shelf that only provides storage levels and in which the actual shelf bins are formed by containers of variable size and position. Vertical antennas would be disruptive there, but not a contactless vertical scanning by the additional sensor.

The additional sensor preferably has an arrangement of light barriers or a light grid. They are simple and very reliable sensors to satisfy the application with small space and cabling demands to provide the still lacking vertical local information.

The additional sensor is preferably configured and arranged such that the information of the additional sensor allows a local association in a horizontal direction and in a vertical direction. This is an alternative with a more powerful additional sensor, for instance a laser scanner that itself already detects local information in two dimensions. The information of the antennas is then used for a plausibility check or for a refinement of the local information.

The antenna and the additional sensor are preferably arranged at the shelf such that a placement and/or a removal of products or containers is recognized. With a Kanban shelf, this is at the front side and/or at the rear side.

The antenna and/or the additional sensor preferably has/have a display element. Application examples are error messages, displaying the occupancy status, presence display of a container, inputting a filling or removal, displaying objects to be removed or to be refilled or the display of the information read from the transponder. Simple flashing codes or color codes of inexpensive LEDs are sufficient for the display of most of this information. A display of a row and of a column can in particular take place simultaneously at the antenna and at the additional sensor to request or to acknowledge a filling or a removal.

The method in accordance with the invention can be further developed in a similar manner and shows similar advantages in so doing. Such advantageous features are described in an exemplary, but not exclusive manner in the subordinate claims dependent on the independent claims.

Figure 2:
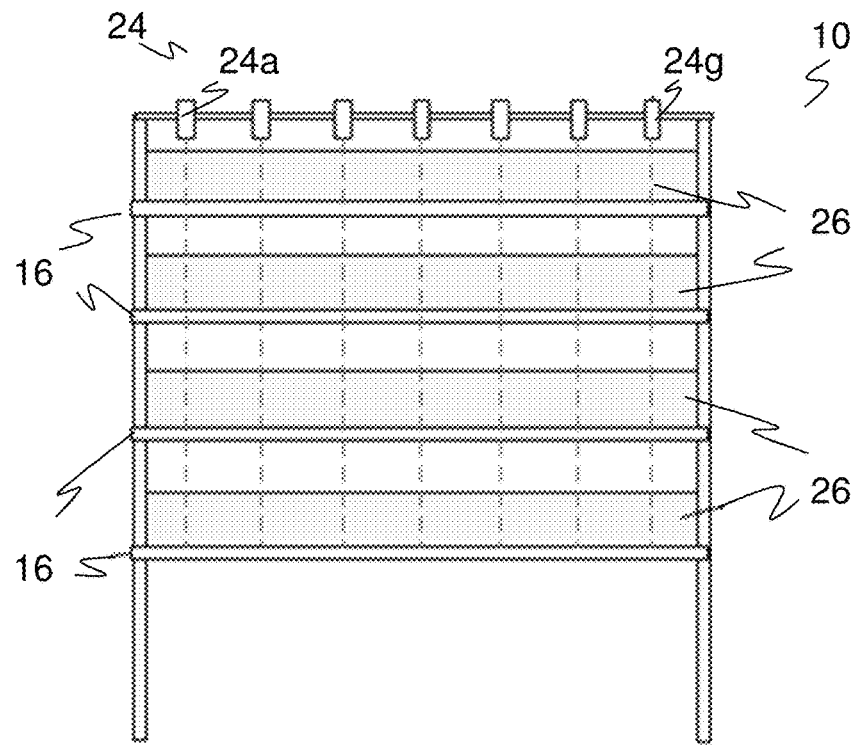
Figure 3:
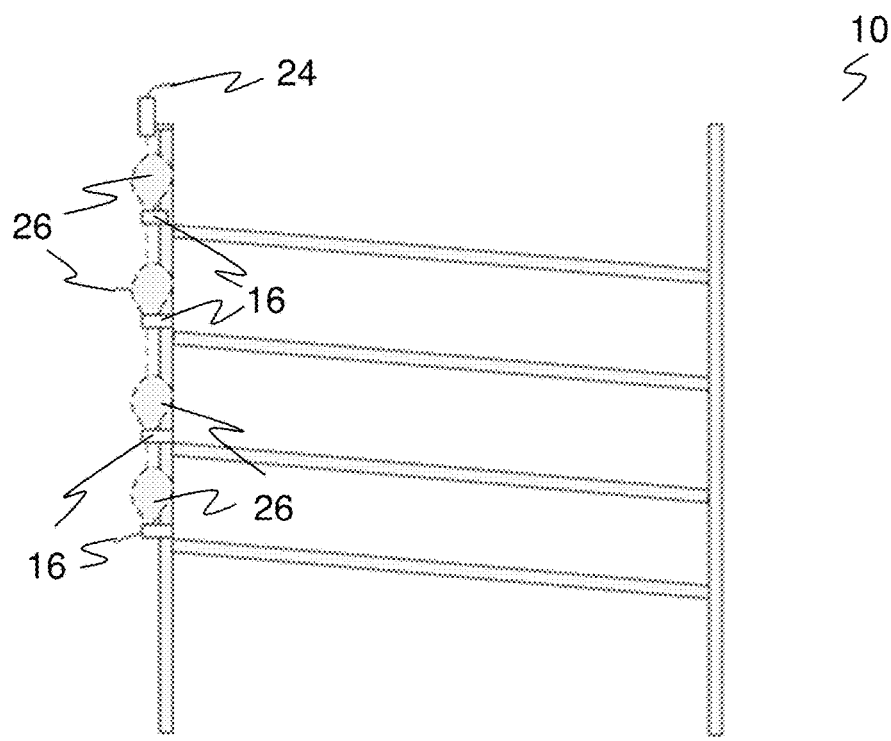
Figure 4:
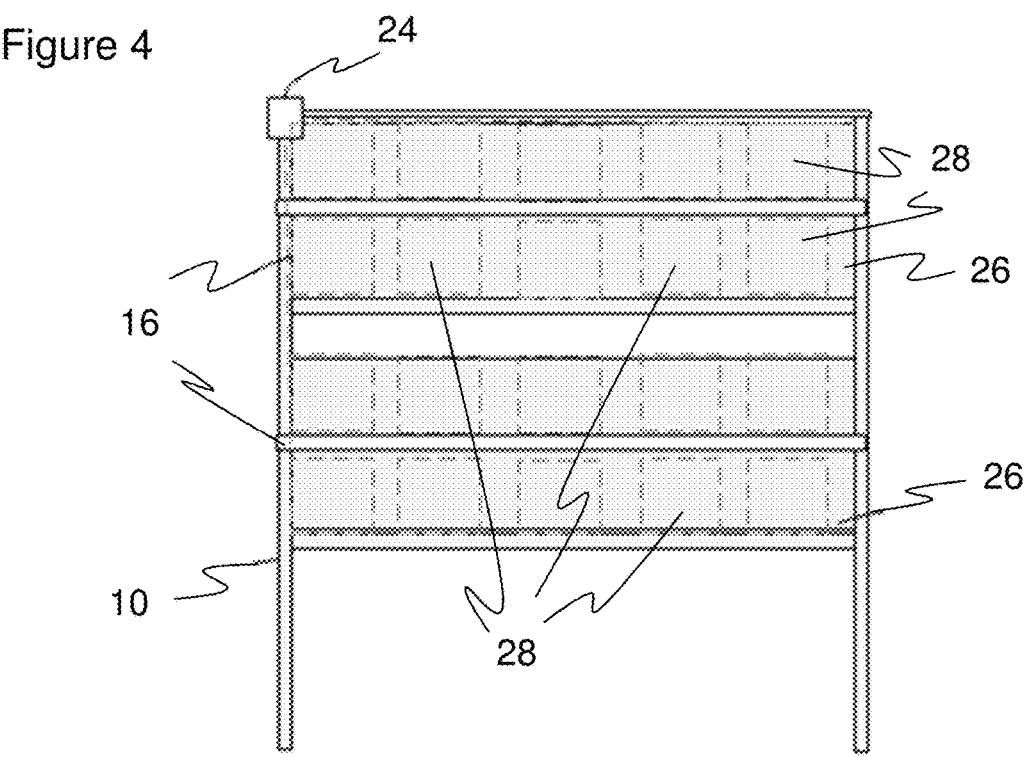
Figure 5:
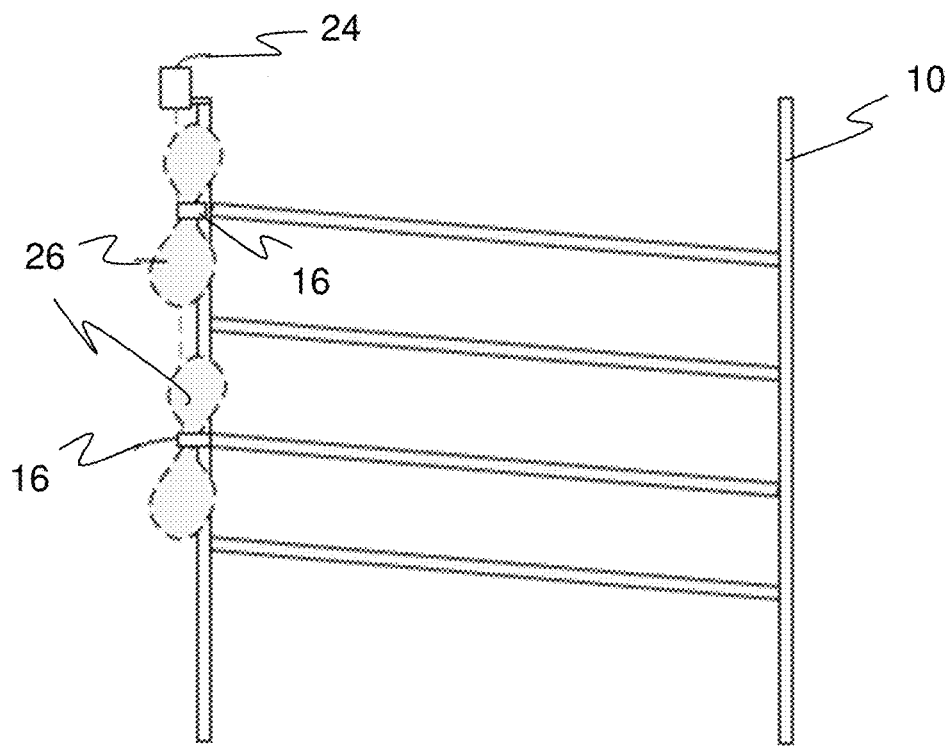

The invention will be explained in more detail in the following also with respect to further features and advantages by way of example with reference to embodiments and to the enclosed drawing. The Figures of the drawing show in:

FIG. 1 an overview representation of a shelf with an RFID reading apparatus in accordance with the invention;

FIG. 2 a simplified representation of the shelf to illustrate the reading fields of the respective antennas;

FIG. 3 a side view of the shelf to illustrate the installation position of the RFID reading apparatus;

FIG. 4 a representation similar to FIG. 2 of a shelf with alternative reading fields of the respective antenna; and FIG. 5 a side representation of FIG. 4.

FIG. 1 shows an overview representation of a shelf 10 having a plurality of containers 12, in particular Kanban containers. Objects, not shown, are stored in the containers 12. In different embodiments, bins can be separated by the shelf 10 itself or objects can be stored without containers 12. The containers 12 and/or the objects located therein are provided with transponders 14.

A plurality of elongated antennas 16 are attached to the shelf 10. These antennas 16 are part of an RFID reading apparatus 18 that is shown as a set-back block in FIG. 1. It is, however, alternatively possible to integrate the RFID reading apparatus 18 at least partly, or also completely, in the shelf 10. The RFID reading apparatus 18 has an RF transceiver 20 that is connected to the antennas 16 and has a control and evaluation unit 22.

An additional sensor 24 for object detection is additionally attached to the shelf 10, here as an example an arrangement of light barriers 24a-d. The light barriers 24a-d are arranged perpendicular to the plane of the paper offset in front of the shelf 10 and therefore register a beam interruption when a container 12 is placed in or removed or, with a correspondingly wide detection beam or beam pattern, also when said container is accessed.

The RFID reading apparatus 20 reads the transponder 14 in a manner known per se. For this purpose, the functions of a conventional RFID process are implemented in the control and evaluation unit, for example in accordance with ISO 18000-6, and the RFID signals required for communication with the transponders 14 are exchanged over the RF transceiver 20 and the antennas 16.

To detect the occupancy of the individual shelf positions with containers 12, the control and evaluation unit 22 evaluates a combination of information of the antennas 16 and of the additional sensor 24. In the embodiment in accordance with FIG. 1, the antenna delivers the local information via the shelf plane, namely in that it is determined which antenna 16 is influenced by the container 12, for example because its resonant behavior changes, or which antenna can read an RFID transponder 14 of the container 12. The missing local information within the shelf plane delivers a beam interruption of the corresponding light barrier 24a-d. Another possibility is to have an RFID reading triggered by a beam interruption of a light barrier 24a-d so that the local information in the horizontal direction is already detected. It is then determined which antenna 16 can communicate with an RFID transponder 14 of the interrupting object to also supplement the shelf plane, i.e. the lack of local information in the vertical direction.

The association of objects and containers 12 with a respective bin or with a position in the shelf 10 is thereby calculated. The RFID reading apparatus 18 or a higher-ranking system (warehouse management, ERP) to which the RFID reading apparatus 18 is connected is in this manner aware of the respective current occupancy of the shelf 10 with containers 12 and objects. In another respect, the typical term RFID reading apparatus 18 should by no means preclude that RFID transponders 14 are also described; however, the reading is the more important task as a rule.

FIG. 2 shows the shelf 10 again in a simplified form from the front. In this respect, only the frame of the shelf 10 and the pattern of the antennas 16 and of the additional sensor 24 used for the localization are shown. This again illustrates the division of work of the antennas 16 and of the additional sensor 24 in the local association in the horizontal and vertical axes.

The antenna lobes 26 are indicated by gray shading over their respective antennas 16. In this embodiment, the antennas 16 have a near field with a high front-to-back ratio; they therefore only detect RFID transponders 14 in a dedicated shelf level. An RFID reading by an antenna 16 can thereby be very simply associated with a shelf level. The additional sensor 24 delivers the missing column position within the shelf level.

FIG. 3 shows an associated side view of a shelf 10 that is configured by way of example as a Kanban shelf. It is filled from a side, the left side in the representation, and objects are removed at the other side. The slanted position of the shelf levels has the effect that the objects slide on toward the removal side. The RFID reading apparatus 10 is here installed at the side at which the shelf 10 is filled. The RFID identification, the localization of objects and containers 12, and the association accordingly takes place during filling. Only the upwardly directed antenna lobes 26 can be clearly recognized that enable an association with a shelf level. The association within the shelf level by the additional sensor 24 is not illustrated in the side view. It is conceivable additionally or alternatively to install the RFID reading apparatus 10 at the other side of the shelf 10 to recognize, to localize and to identify removals.

FIGS. 4 and 5 show a front view and a side view corresponding to FIGS. 2 and 3 for a further embodiment of the RFID reading apparatus 18. An area sensor, for example a laser scanner that can determine the part field 28 in which an intervention takes place is installed as an additional sensor 24 here instead of a light barrier arrangement. This additional sensor 24 is therefore already per se able to localize in two axes on its own. Although this can be sufficient in practice, the information from the antenna 16 is nevertheless likewise used in accordance with the invention to check or to refine this localization.

In addition, in this embodiment, the antennas 16 are also modified, namely now a near field with a lower front-to-back ratio. Antenna lobes 26 thereby arise that detect RFID transponders 14 in the shelf level disposed both at the top and at the bottom. In principle, only half so many antennas 16 are sufficient for each second shelf level. Alternatively, the number of antennas 16 remains unchanged. This provides the opportunity of reading RFID transponders 14 from two sides that can thus be attached more variably to objects.

Although FIGS. 4 and 5 simultaneously introduce an area sensor and different antenna lobes 26 as the additional sensor 24, these modifications are also conceivable individually.

The invention claimed is:

1. An RFID reading apparatus for bin occupancy recognition in a shelf, the RFID reading apparatus comprising:
    at least one antenna;
    an RF transceiver connected to the antenna;
    a control and evaluation unit that is configured to communicate with an RFID transponder by means of RFID signals via the RF transceiver and the antenna, wherein the RFID transponder is associated with an object adapted to be removably received on a shelf; and
    at least one additional sensor for detecting objects at or in the shelf, the at least one additional sensor being mounted on the shelf external to the object adapted to be removably received on the shelf,
    wherein the control and evaluation unit is configured to recognize and locally associate changes of the bin occupancy from a combination of information of the antenna and information of the additional sensor.

2. The RFID reading apparatus in accordance with claim 1, wherein the at least one additional sensor is an optoelectronic sensor.

3. The RFID reading apparatus in accordance with claim 1, wherein the at least one antenna is arranged in parallel with shelf elements of the shelf.

4. The RFID reading apparatus in accordance with claim 1, wherein the at least one antenna is used as a shelf element.

5. The RFID reading apparatus in accordance with claim 1, wherein the at least one antenna is at least one antenna elongated over one of a shelf width and a shelf height.

6. The RFID reading apparatus in accordance with claim 1, wherein the at least one antenna comprises a plurality of antennas, a respective one of the antennas being respectively positioned at a corresponding shelf level, wherein the antennas each have antenna lobes only upwardly or only downwardly.

7. The RFID reading apparatus in accordance with claim 1, wherein the at least one antenna comprises a plurality of antennas, a respective one of the antennas being respectively positioned at every second one of a set of shelf levels, with the antennas each having antenna lobes upwardly and downwardly.

8. The RFID reading apparatus in accordance with claim 1, wherein the at least one antenna and the at least one additional sensor are configured and arranged such that the information of the at least one antenna enables a local association with a shelf level and the information of the at least one additional sensor enables a local association within the shelf level.

9. The RFID reading apparatus in accordance with claim 8, wherein the at least one additional sensor has an arrangement of light barriers.

10. The RFID reading apparatus in accordance with claim 8, wherein the at least one additional sensor has a light grid.

11. The RFID reading apparatus in accordance with claim 1, wherein the at least one additional sensor is configured and arranged such that sensed information of the at least one additional sensor enables a local association in a horizontal direction and in a vertical direction.

12. The RFID reading apparatus in accordance with claim 1, wherein the at least one antenna and the at least one additional sensor are arranged at the shelf such that at least one of a placement of goods or containers and a removal of goods or containers is recognized.

13. The RFID reading apparatus in accordance with claim 1, wherein at least one of the at least one antenna and the at least one additional sensor has a display element.

14. A method for bin occupancy recognition in a shelf, in which method communication takes place with RFID transponders in the shelf by means of RFID signals via an antenna, wherein the RFID transponders are respectively associated with objects adapted to be removably received on the shelf, wherein the objects at or in the shelf are detected using an additional sensor, wherein changes of the bin occupancy are recognized and locally associated from a combination of information of the antenna and information of the additional sensor, the additional sensor being mounted on the shelf external to the objects adapted to be removably received on the shelf.

* * * * *